(12) United States Patent
Felteau et al.

(10) Patent No.: US 11,608,680 B2
(45) Date of Patent: Mar. 21, 2023

(54) SYSTEMS AND METHODS FOR CONTROL CONFIGURATION FOR INSTALLED ARCHITECTURAL STRUCTURAL COVERINGS

(71) Applicant: Hunter Douglas Inc., Pearl River, NY (US)

(72) Inventors: Wesley Felteau, Golden, CO (US); Chris Chares, Denver, CO (US); Matthew Hedrick, Westminster, CO (US)

(73) Assignee: Hunter Douglas Inc., Pearl River, NY (US)

( * ) Notice: Subject to any disclaimer, the term of this patent is extended or adjusted under 35 U.S.C. 154(b) by 367 days.

(21) Appl. No.: 17/014,817

(22) Filed: Sep. 8, 2020

(65) Prior Publication Data

US 2021/0079724 A1 Mar. 18, 2021

Related U.S. Application Data

(60) Provisional application No. 62/900,028, filed on Sep. 13, 2019.

(51) Int. Cl.
*E06B 9/42* (2006.01)
*E06B 9/68* (2006.01)
(Continued)

(52) U.S. Cl.
CPC ............. *E06B 9/42* (2013.01); *E06B 9/68* (2013.01); *G06F 3/0484* (2013.01);
(Continued)

(58) Field of Classification Search
CPC ............. E06B 9/42; E06B 9/68; G06F 3/0484
See application file for complete search history.

(56) References Cited

U.S. PATENT DOCUMENTS

2015/0285535 A1* 10/2015 Hall .................. E06B 9/266 160/1
2015/0288316 A1* 10/2015 Hall .................. E06B 9/326 318/434
(Continued)

FOREIGN PATENT DOCUMENTS

EP 2961185 A1 12/2015
EP 3205810 A1 8/2017

OTHER PUBLICATIONS

Extended European Search Report dated Feb. 9, 2021 in European Patent Application No. 20195770.1, 10 pages.

*Primary Examiner* — David E Choi
(74) *Attorney, Agent, or Firm* — Kilpatrick Townsend & Stockton LLP

(57) ABSTRACT

Systems and methods for configuring a user device to remotely control a plurality of architectural structural coverings are described. A user device receives a plurality of broadcast signals from a plurality of architectural structural coverings. Each individual broadcast signal is associated with an individual architectural structural covering and relays position information for the individual architectural structural covering. Each broadcast signal is also associated with an individual entry in a list of entries displayed on a user interface of the user device. Each entry comprises a representation of an architectural structural covering having a displayed position that matches position information from the broadcast signal and a position control for controlling a physical position of the associated architectural structural covering. When a user adjusts the position via the position control, an adjusted position instruction is sent to the associated architectural structural covering. The displayed position of the representation on the UI is changed to mirror a change in the physical position of the architectural structural (Continued)

covering as the user device observes broadcast position data from the architectural structural covering.

22 Claims, 12 Drawing Sheets

(51) Int. Cl.
  *G06F 3/0484* (2022.01)
  *G08C 17/02* (2006.01)
(52) U.S. Cl.
  CPC ...... *E06B 2009/6845* (2013.01); *G08C 17/02* (2013.01); *G08C 2201/93* (2013.01)

(56) References Cited

U.S. PATENT DOCUMENTS

| | | | |
|---|---|---|---|
| 2017/0075468 A1* | 3/2017 | Dziuk | H04L 65/764 |
| 2017/0123644 A1* | 5/2017 | Ren | G06F 3/04847 |
| 2020/0028734 A1* | 1/2020 | Emigh | H04L 12/281 |
| 2021/0079724 A1* | 3/2021 | Felteau | E06B 9/68 |
| 2021/0234927 A1* | 7/2021 | Sohn | G16Y 40/30 |

* cited by examiner

SYSTEMS AND METHODS FOR CONTROL CONFIGURATION FOR INSTALLED ARCHITECTURAL STRUCTURAL COVERINGS

CROSS-REFERENCE TO RELATED APPLICATION

This application claims priority to U.S. Provisional Patent Application No. 62/900,028, filed Sep. 13, 2019, and titled "SYSTEMS AND METHODS FOR CONTROL CONFIGURATION FOR INSTALLED ARCHITECTURAL STRUCTURAL COVERINGS," the content of which is hereby incorporated by reference in its entirety for all purposes.

BACKGROUND

Architectural structural coverings, such as blinds, shades, shutters, drapes, provide shading and privacy in buildings such as office buildings, multi-unit dwellings, and houses. Some architectural structural coverings may be manually operable (e.g., through use of a lift chord), while other architectural structural coverings may be motorized (e.g., by an electronic motor). Motorized architectural structural coverings can be operated remotely by a user device (e.g., a remote control, mobile device, keypad). However, it is often difficult to configure the user device for remote operation because it is difficult to determine which controls/buttons are initially connected to which architectural structural coverings. Typically, this process is done by trial and error—that is, by individually trying each control to see which architectural structural covering it activates. This process is made even more difficult and time consuming in buildings with multiple rooms and/or buildings with a large number of architectural structural coverings that need to be configured for remote control.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure relate to set up/configuration of user interfaces for user devices to directly control a desired architectural structural covering and to organize the user interface controls as a user desires. As an example, a user device provides a user interface (UI) to process operational controls and generate control instructions for the coverings. The user device detects nearby coverings based on a broadcast signal from each covering. The broadcast signal provides live updates (e.g., real-time information) including a covering ID and one or more position IDs that are synched with a user interface on the user device. The UI includes a representation of the covering with a position that matches the position of the actual covering with which it is paired. As the position of the actual covering changes, the position of its representation also changes in real time. As a result, users and installers may readily identify the pairing of each specific covering with its representation on the user interface and set up the user device's control of the plurality of coverings to meet their needs. In aspects, a combination control may be used to simultaneously change the positions of multiple architectural coverings and the positions of their associated representations in the UI to identify and configure the remote control of multiple architectural structural coverings at once. In this way, users are able to more directly interact with the coverings and/or control the coverings without needing to move back and forth throughout the building to identify the control pairings between the user device and the coverings. In aspects, users may then change the pairings so that a particular control is paired to a particular architectural structural covering as the user desires.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Architectural structure coverings are typically placed over an architectural structure, for example, but not limited to, windows, doors, doorways, etc. The coverings are remotely controlled by a user device, such as, but not limited to, a mobile computing device (e.g., smartphone or remote control), a tablet computing device, a laptop computing device, or a desktop computing device, among other electronic devices. The user device provides a user interface (UI) for receiving operational control instructions from the user (e.g., extend or retract and/or open or close the covering or vanes within the covering), which causes movement control instructions to be provided to the covering and control its movement. Edifices (e.g., homes, businesses, offices, and other like buildings or structures) often have a large number of similar type coverings that are disposed in different areas. As such, it is difficult for a user to set up and use the remote control system because identifying locations of the control pairings between the UI and the coverings may require movement back and forth among areas and coverings. Accordingly, the systems and methods described herein relate to providing a broadcast signal that matches the position of each covering with a representation of the associated covering on the user interface of the user device. Position information is updated in real time. The real-time update of position pairs between the actual covering and UI representation allows users to easily identify which covering matches which UI representation. Users may then use this information to set up the user device by reorganizing the UI representations of the coverings to meet their needs. As a result, the user is able to more set up the user device to directly interact with the coverings and/or control the coverings using techniques that were not previously available. Additionally, the overall system can be more power efficient. More specifically, by improving the identification of location pairs due to the broadcasting of position data and corresponding representation on a UI in real-time, the trial and error to control particular coverings via a user device is reduced. Accordingly, the overall amount of signaling between the coverings and the user device is reduced and, in turn, the overall power consumption is reduced. Such power efficiency is important especially in situations where the coverings and/or the user device are battery powered.

Figure 1:
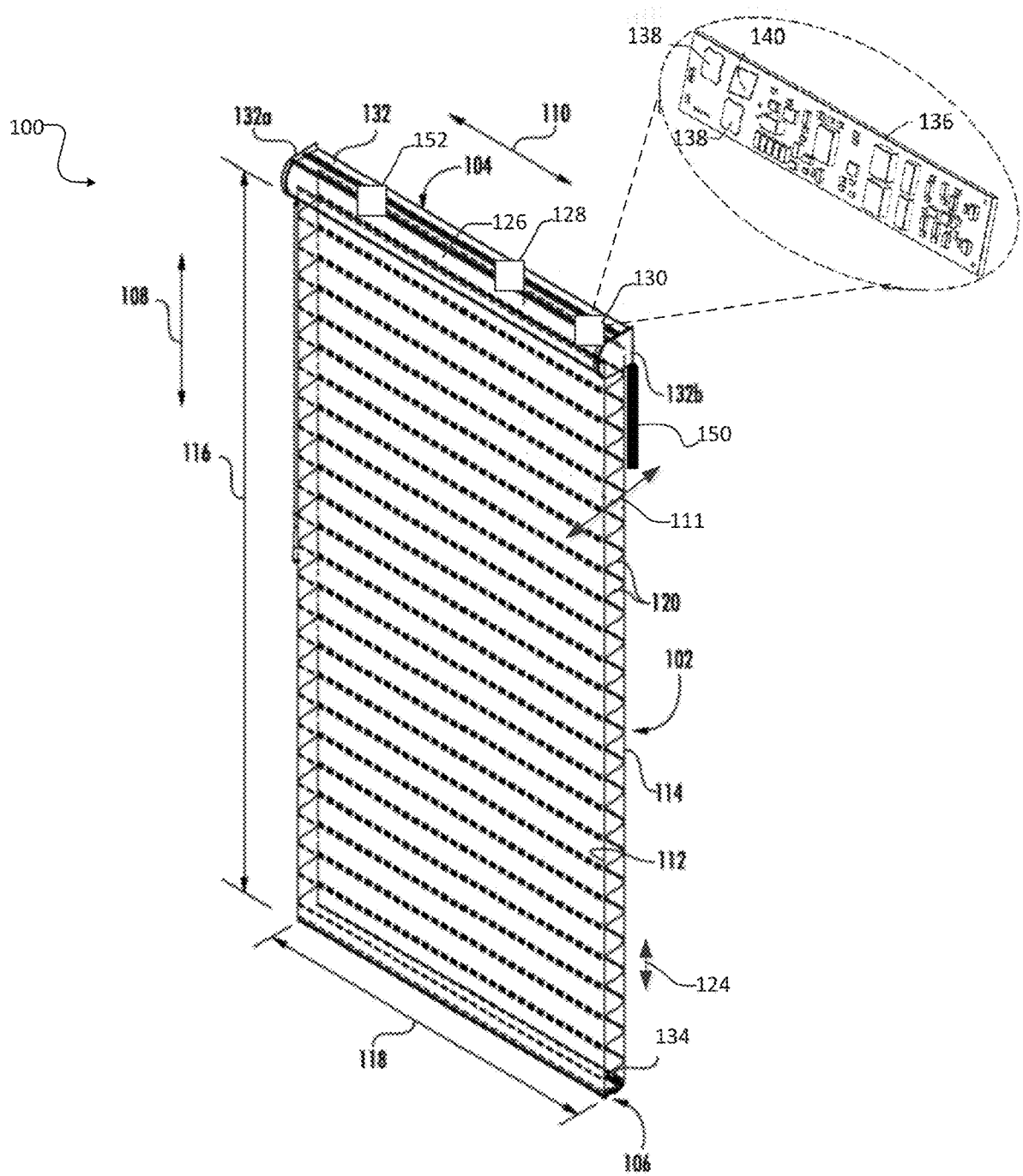
FIG. 1 is a perspective view of an exemplary architectural structural covering in an open and extended configuration.

FIG. 1 is a perspective view of an exemplary architectural structural covering 100 in an open and extended configuration. The architectural structural covering 100 includes a shade panel 102 configured to extend vertically between a roller assembly 104 and a bottom rail assembly 106. The shade panel 102 may generally be configured to be moved vertically 108 relative to the roller assembly 104 between a fully lowered or extended position (e.g., as illustrated in FIG. 1) and a fully raised or retracted position (not shown). When the architectural structural covering 100 is in its retracted position, the shade panel 102 is configured to expose an adjacent architectural building (e.g., a window), and when the covering 100 is its extended position, the shade panel 102 is configured to cover the adjacent architectural building. Additionally, the covering 100 is configured to move the shade panel 102 to any number of intermediate positions defined between the fully retracted and fully extended positions so that the shade panel 102 partially covers the adjacent architectural building.

In the example it should be appreciated that, as used herein, the term "vertical" describes the orientation or arrangement of the covering 100 in its extended position (e.g., closed) as indicated by arrow 108 and such as when the covering 100 is mounted for use relative to an adjacent architectural building. Similarly, the term "horizontal" general described a direction perpendicular to vertical 108 and that extends side-to-side relative to the covering 100, as illustrated by arrow 110. Further, the term "cross-wise" generally describes a direction perpendicular to both vertical 108 and horizontal 110 and extends front-to-back relative to the covering 100, as illustrated by arrow 111. The various directional references used herein are simply utilized to provide context to the examples shown, and thus, should not be construed as otherwise limiting. For instance, some architectural structure coverings 100 may have its shade panel 102 configured to extend and retract in the horizontal direction.

In some examples, the shade panel 102 includes both a front panel 112 and a back panel 114, with the front and back panels 112, 114 being configured to be arranged generally parallel to each other in the vertical direction 108 and when the shade panel 102 is moved to its fully extended position (shown in FIG. 1). In general, the panels 112, 114 may be formed from any material suitable for use within the disclosed covering 100, such as a textile, a woven and/or non-woven fabric, and/or the like. However, in some examples, one or both of the panels 112, 114 are formed from a sheer fabric or other suitable material(s) that allows at least a portion of the light hitting the shade panel 102 to pass from one panel to the other. Additionally, it should be appreciated that the front and back panels 112, 114 may generally be sized, as required or desired, to use relative to any suitable architectural building. For example, the panels 112, 114 defines a vertical height 116 and/or a horizontal width 118 sufficient to cover a window or other architectural building. In one example, the front and back panels 112, 114 may define substantially the same height 116 and/or width 118 such that the panels 112, 114 are substantially coextensive when the shade panel 102 is in its fully extended position.

The shade panel 102 also includes a plurality of light blocking members or vanes 120 that extend between the front and back panels 112, 114, with the vanes 120 being spaced apart vertically from one another along the vertical height 116 of the shade panel 102. In some examples, each vane 120 is configured to extend the full depth or cross-wise direction 111 between the front and back panels 112, 114. For example, each vane 120 includes a front edge coupled to the front panel 112, and a back edge coupled to the back panel 114, using any suitable means, such as stitching, sticking, adhesives, mechanical fasteners, and/or the like. Additionally, similar to the panels 112, 114, the vanes 120 are formed from any material suitable for use within the disclosed covering 100, such as a textile, a woven and/or non-woven fabric, and/or the like. However, in some examples, the vanes 120 are formed from a material used to form the front and back panels 112, 114. For example, each vane 120 are formed from a light blocking or opaque material or a translucent material.

In operation, when the shade panel 102 is positioned in its fully extended (e.g., closed) (shown in FIG. 1) position, the relative positioning of the front and back panels 112, 114 may be adjusted such that the vanes 120 are tilted to control the amount of light passing through the shade panel 102 (and to allow a view through the shade panel) as required or desired. In some examples, the shade panel 102 is configured such that, when the front and back panels 112, 114 are moved vertically 108 relative to each other (e.g., when the back panel 114 is raised and the front panel 112 is simultaneously lowered or when the back panel 114 is lowered and the front panel 112 is simultaneously raised), the orientation or tilt angle of the vanes 120 defined between the front and back panels is adjusted. For example and as illustrated in FIG. 1, the vanes 120 are moved to a substantially horizontal position between the panels 112, 114 such that a vertical light gap 124 is defined between each adjacent pair of vanes 120 and the vanes 120 are in a fully opened configuration. In this "opened" position, light may pass directly through the light gaps 124 defined between the vanes 120. Alternatively, the vanes 120 are tilted to an at least partially overlapping, substantially vertical position between the panels 112, 114 (not shown) such that the vanes 120 are in a fully closed configuration (not shown). In this closed position, the overlapping vanes 120 serve to prevent all or a portion of the light hitting the shade panel 102 from passing there through.

Additionally, the vanes 120 may be tilted to any number of intermediate tilt positions defined between the fully open and closed positions. The orientation of the vanes 120 between and including the fully open and closed position, can also be referred to as view through position. It should be appreciated that in one example, the vanes 120 are spaced apart from one another and/or dimensioned such that, when moved to the opened position, the vanes 120 are oriented substantially horizontally 110 between the vertically hanging panels 112, 114, and when moved to the closed position, the shade panel 102 has a collapsed configuration in which both the vanes 120 and the panels 112, 114 hang in a substantially vertical 108 orientation.

The roller assembly 104 of the architectural structure covering 100 includes an operating mechanism 126 configured to support the shade panel 102 and control the extension and retraction of the shade panel 102 between its fully extended and retracted positions. In addition, the operating mechanism 126 controls the tilt of the vanes 120 between their fully opened and closed positions. In some examples, the operating mechanism 126 is covered by a valance or other suitable covering. For instance and as illustrated in FIG. 1, the roller assembly 104 includes a head rail or cover 132 and corresponding endcaps 132*a*, 132*b* configured to at least partially encase the operating mechanism 126. Moreover, various other components of the roller assembly 104 may also be configured to be housed within the head rail 132 as required or desired. In the example, the operating mechanism 126 includes a single assembly (e.g., a motor 128 and a controller 130) that drives the extension and retraction movements of the shade panel 102 and the opening and closing movements of the vanes 120. In other examples, the operating mechanism 126 may have separate assemblies to drive the extension and retraction movements and the opening and closing movements, respectively. The architectural structural covering 100 may further include a separate back panel 1100, such as a blackout shade, who's extended (closed)/retracted (open) position is controlled separately from covering 100. As shown in FIG. 1, shade 1100 is shown in a partially retracted position. The roller assembly 104 of the architectural structural covering 100 includes a lift assembly 1102 that is configured to control the extension and retraction of the shade 1100 between its extended and retracted positions.

It should be appreciated that one example of an architectural structure covering 100 is illustrated and described in FIG. 1. The architectural structure covering 100, however, may be any type of covering that at least partially covers an architectural element such as a window, a door, an opening, a wall, etc. In one example, the architectural structure covering 100 can be a shear-type covering. In an aspect, the shade panel has sheer front and back panels that extend and retract, and a plurality of light blocking vanes extending between the panels that tilt to open and close the covering. In another aspect, the shade panel has a single sheer panel that extends and retracts, and a plurality of light blocking vanes attached to the sheer panel that open and close by sliding one end of the vane relative to the panel. In yet another aspect, the shade panel has a single sheer panel that extends and retracts, and a plurality of light blocking vanes that extend substantially vertically that rotate to open and close.

In another example, the architectural structure covering 100 can be a cellular-type covering. In an aspect, the shade panel has a front and back panel that are connected to each other in a cellular pattern (e.g., a honeycomb-type pattern, a roman-type pattern, etc.) and that extend and retract in an accordion-type motion. This type of cellular pattern creates a layer of insulation (e.g., air) within the covering.

In yet another example, the architectural structure covering 100 can be a roman-type covering. In an aspect, the shade panel has a single panel with a plurality of fabric folds that extends and retracts via a rolling motion (e.g., rolling the folds) or a stacking motion (e.g., stacking the folds). In another aspect, the shade panel has a front and back panel connected in a cellular pattern as described above and that extends and retracts. These panels include excess fabric to generate the roman-type folds when the covering is retracted, and are not necessarily configured to move in an open and close direction.

In still another example, the architectural structure covering 100 can be a roller-type covering. In an aspect, the shade panel has a front and back panel connected in a cellular pattern as described above, but extend and retract via a rolling motion. In another aspect, the shade panel has a single panel that extends and retracts in a rolling motion. This type of single panel can be fully or partially light blocking as required or desired, and are not necessarily configured to move in an open and closed direction. In other examples, the single panel can be a UV-blocking shade. In yet another aspect, the shade panel has a front and back panel that each have alternating sheer and light blocking bands. In this example, the shade panel is extended and retracted by a rolling motion, and also open and closed by moving the panels relative to one another.

Additionally or alternatively, the architectural structure covering 100 can be a shutter-type covering. In an aspect, the shade panel has a plurality of light blocking vanes that tilt to open and close the covering, and are not necessarily configured to move in an extended and retracted direction. The architectural structure covering 100 can be a slat-type covering. In an aspect, the shade panel has a plurality of light blocking vanes (e.g., slats) that move relative to each other to extend and retract the covering, and tilt to open and close the covering. The architectural structure covering 100 can also be a vertical-type covering. In an aspect, the shade panel has a plurality of light blocking vanes (e.g., panels or louvers) that move relative to each other in a horizontal direction to extend and retract the covering, and rotate to open and close the covering. Generally, the architectural structure covering 100 can be any type of covering that is enabled to extend and retract and/or open and close as described herein.

In the example, the operating mechanism 126 is electronic and motorized so that the architectural structure covering 100 is remotely operable as required or desired. The controller 130 of the operating mechanism 126 includes one or more printed circuit boards 136 for operably controlling movement of the shade panel 102 via the motor 128. The circuit board 136 electronically communicates via wired or wireless communication with the motor 128 that drives movement of the shade panel 102 and includes the electrical components (e.g., an architectural structure covering controller such as architectural structure covering controller 142 of FIG. 2) for operating the architectural structure covering 100. The circuit board 136 and/or motor 128 may be powered by a combination of internal and/or external power line connections, battery(ies), fuel cells, solar panels, wind powered generator, and/or any other power source as required or desired. The circuit board 136 includes one or more sensors 138 so as to determine a position of the operating mechanism 126, and thus, a position of the shade panel 102 (e.g., an extended/retracted and/or open/close position). Additionally, the circuit board 136 includes a communication device 140 such as a transmitter, a receiver, a transceiver, and/or other interface to facilitate exchange of data with remote devices (e.g., user device 212 of FIGS. 3 and 4).

In operation, the architectural structural covering 100 receives operational instructions from a remote device and process and respond to the received instructions accordingly. For example, user devices may control movement of the operating mechanism 126 (shown in FIG. 1) so as to extend or retract and/or open or close the shade panel 102 and control movement of the lift assembly 152 so as to extend or retract the shade panel 152 as required or desired. Furthermore, the architectural structural covering 100 generates a broadcast signal for receipt by the user device so that the user device can determine the type, proximity, identification, and position(s), among other things, of the covering 100 as described further herein.

Figure 2:
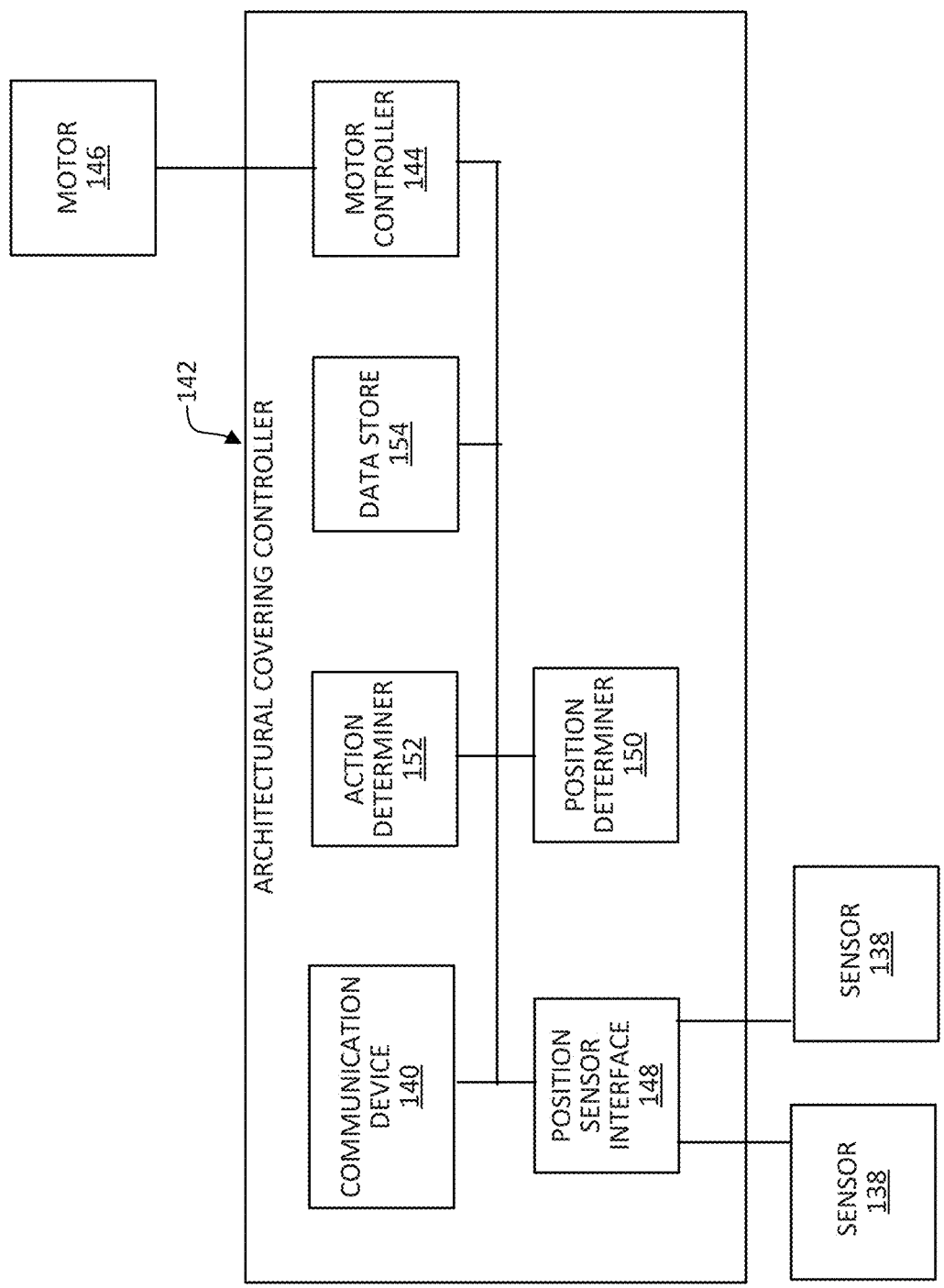
FIG. 2 is a block diagram of an exemplary architectural structural covering controller of the architectural structural covering shown in FIG. 1.

FIG. 2 is a block diagram of an exemplary architectural structural covering controller 142 of the architectural structural covering 100 (shown in FIG. 1). In the example described below, the architectural structural covering controller 142 is described in connection with the operating mechanism 126 (shown in FIG. 1), however, it is understood that the controller 142 may likewise be used to control any other component of the architectural structural covering 100 as required or desired. In some aspects, the architectural structural covering controller 142 is implemented on the circuit board 136 (shown in FIG. 1).

In the example, the architectural structural covering controller 142 includes a motor controller 144 that controls one or more motors 128 of the assembly based on one or more commands. For example, the motor controller 144 controls the direction of rotation of an output shaft of the motor 128, the speed of the output shaft, and/or other operations of the motor so as to extend and retract and open and close the shade panel 102 (shown in FIG. 1).

The architectural structural covering controller 142 also includes a position sensor interface 148 that receives signals from the position sensors 138. The position sensor 138 includes, for example, a magnetic encoder, a rotary encoder, a gravitational sensor, etc. The position sensor 138 is used to count pulses or rotations of the motor 128, to track the position of a rotating element (e.g., the output shaft, the roller assembly 104 (shown in FIG. 1), etc.) while movement of the covering is being driven (e.g., by a rotating member or any other driving member). The position sensor interface 148 processes the signals from the position sensor 138 and a position determiner 150 determines a position of the architectural structural covering 100 (shown in FIG. 1) based on the processed signal(s) from the position sensor interface 148.

An action determiner 152 is used to determine what action (if any) is to be performed by the motor 128 based on input information from the communication device 140 (e.g., receiving operational instructions from a remote device) and/or the position determiner 150. In examples, the communication device is operable to communicate with remote devices via a number of different networks or protocols, such as over Wi-Fi, a cellular data network, Bluetooth, Bluetooth Low Energy, etc. For example, if an operational signal is received by the communication device 140 to open the covering, the action determiner 152 sends a signal to the motor controller 144 to activate the motor 128 in an open direction. Similarly, if an operational signal is received by the communication device 140 to close the covering, the action determiner 152 sends a signal to the motor controller 144 to activate the motor 128 in a closed direction. In another example, if an operational signal is received by the communication device 140 to extend the covering, the action determiner 152 sends a signal to the motor controller 144 to activate the motor 128 in an extended direction. Similarly, if an operational signal is received by the communication device 140 to retract the covering, the action determiner 152 sends a signal to the motor controller 144 to activate the motor 128 in a retraction direction. Based on the received operational control signal, the action determiner 152 and the position determiner 150 can selectively use the motor controller 144 to command the motor 128 in one direction or another so that the covering is moved as required or desired.

A data store 154 (e.g., memory) of the architectural structure covering controller 142 is used to store data as required or desired. For example, the data store 154 includes information that is emitted in a broadcast signal from the covering, such as, covering informational data, edifice identification number, and/or power transmission data, as described further below in reference to FIGS. 3 and 4.

Figure 3:
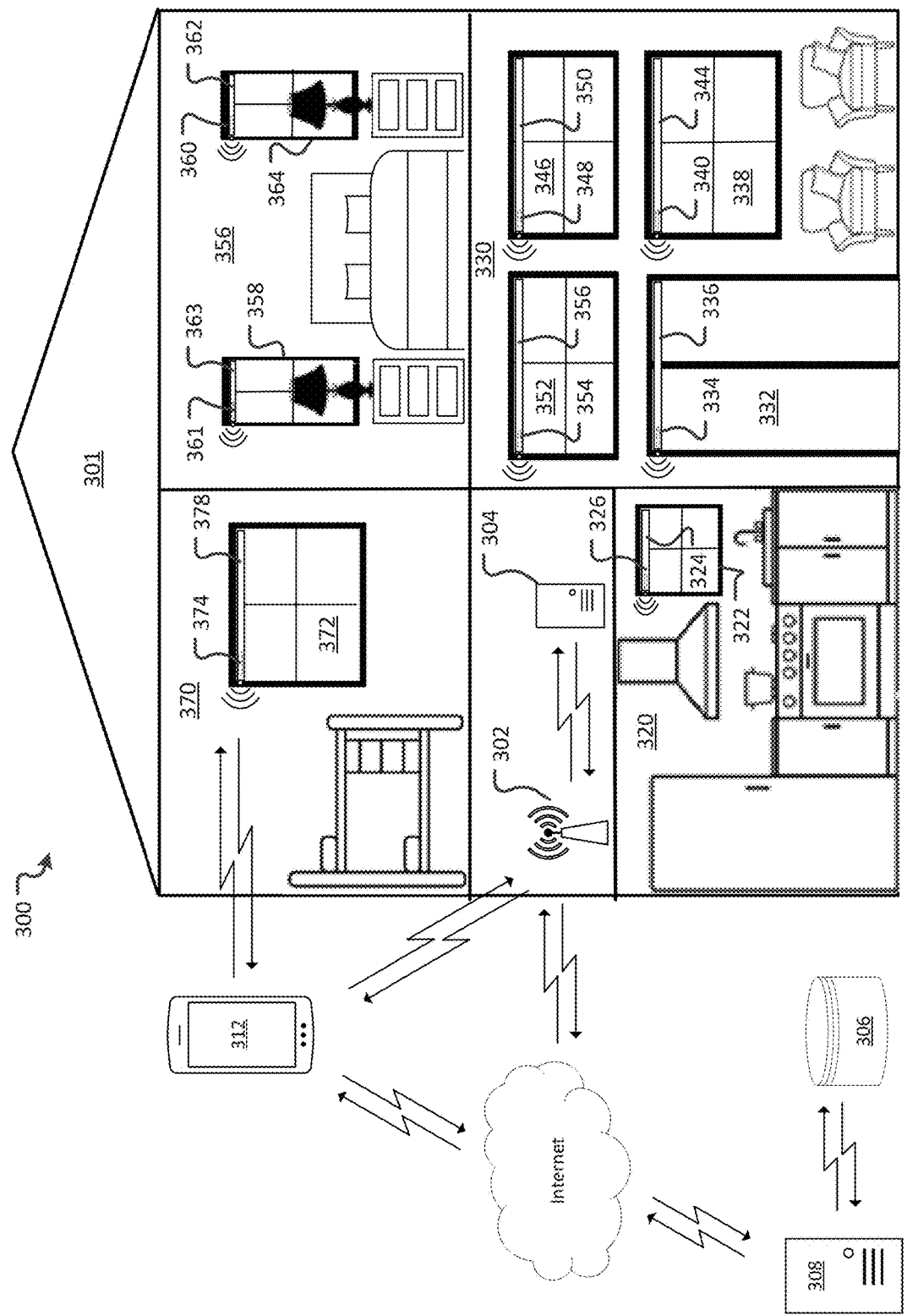
FIG. 3 is an exemplary architectural structural covering system in a use-based environment.

FIG. 3 illustrates an exemplary architectural structural covering system 300. In the example, the system 300 includes an architectural building 301 separated into four architectural areas 320, 330, 356, 370, each containing one or more windows or doors with one or more architectural structural coverings on each. For example, a first architectural area 320 includes a window 322 with a first covering 324, a second architectural area 330 includes a door 332 with second covering 336, a window 338 with third covering 344, a window 346 with fourth covering 350, and a window 352 with fifth covering 356, a third architectural area 356 includes a window 358 with sixth covering 363 and a window 364 with seventh covering 362, and an $n^{th}$ architectural area 370 includes the window 372 with $n^{th}$ covering 378. It should be appreciated that while only eight coverings are illustrated and described, the building 301 may have any number of coverings as required or desired.

A user device 312 is coupled in communication with each of the architectural structural coverings 324, 336, 344, 350, 356, 362, 363, and 378 and can be used to provide operational instructions thereto. The coverings 324, 336, 344, 350, 356, 362, 363, and 378 can receive instructions from the user device 312 and process and respond to the received instructions accordingly. For example, instructions includes to extend or retract and/or open or close the covering. In an example, the user device 312 may be a mobile computing device, a tablet computing device, a laptop computing device, or a desktop computing device, among other electronic devices including remote control devices. The user device 312 and the coverings 324, 336, 344, 350, 356, 362, 363, and 378 may communicate using any of a variety of mechanisms, including, but not limited to, infrared or other optical communication, radio or wireless communication (e.g., Wi-Fi, Bluetooth, etc.), or wired communication.

The architectural areas 320, 330, 356, 370 can be rooms (e.g., bedroom(s), kitchen, dining room, etc.), offices, or any other division or selection of an architectural building 402 as required or desired. Because the coverings 324, 336, 344, 350, 356, 362, 363, and 378 are remotely operable via the user device 312, a user may attempt to operate a specific covering being in a specific area (e.g., second covering 336 in second area 330), but the result is operation of another covering in a different area (e.g., first covering 324 in second area 320). This may induce frustration by the user, as then the user would need to move about the building 301 in order to figure out the control pairings for each of the architectural structural coverings 324, 336, 344, 350, 356, 362, 363, and 378.

Each of the architectural structural coverings 324, 336, 344, 350, 356, 362, 363, and 378 are configured to transmit a broadcast signal 326, 334, 340, 348, 354, 360, 361, and 371 that is received by the user device 312 as will be explained in more detail in FIG. 4. The broadcast signal may further includes information about power/strength of the signal. For example, the first and $n^{th}$ coverings 324, 378 are positioned more towards the exterior of the building 301 and as such, the transmitted broadcast signals 326, 374 may have their transmit power increased so that the signal can be transmitted and received throughout the building 301.

In one example, the user device 312 can locally store a database (e.g., data store or memory 1004 in FIG. 10) containing types and models of the coverings, and use the informational data provided by the signal 326, 334, 340, 348, 354, 360, 361, and 371 to pull and display names of the coverings within a UI on user device 312. The display names may be system generated or user generated. If system generated, they may be changed by a user. The user device 312 is also able to connect to a local server 304 and/or a remote server 308 so as to send and receive information to the database and/or the UI. For example, the remote server 306 can be operated by the covering manufacture. In another example, the user device 312 can be used to push updates to the coverings 324, 336, 344, 350, 356, 362, 363, and 378 via the local gateway server 304 and/or remote server 308 as required or desired.

Figure 4:
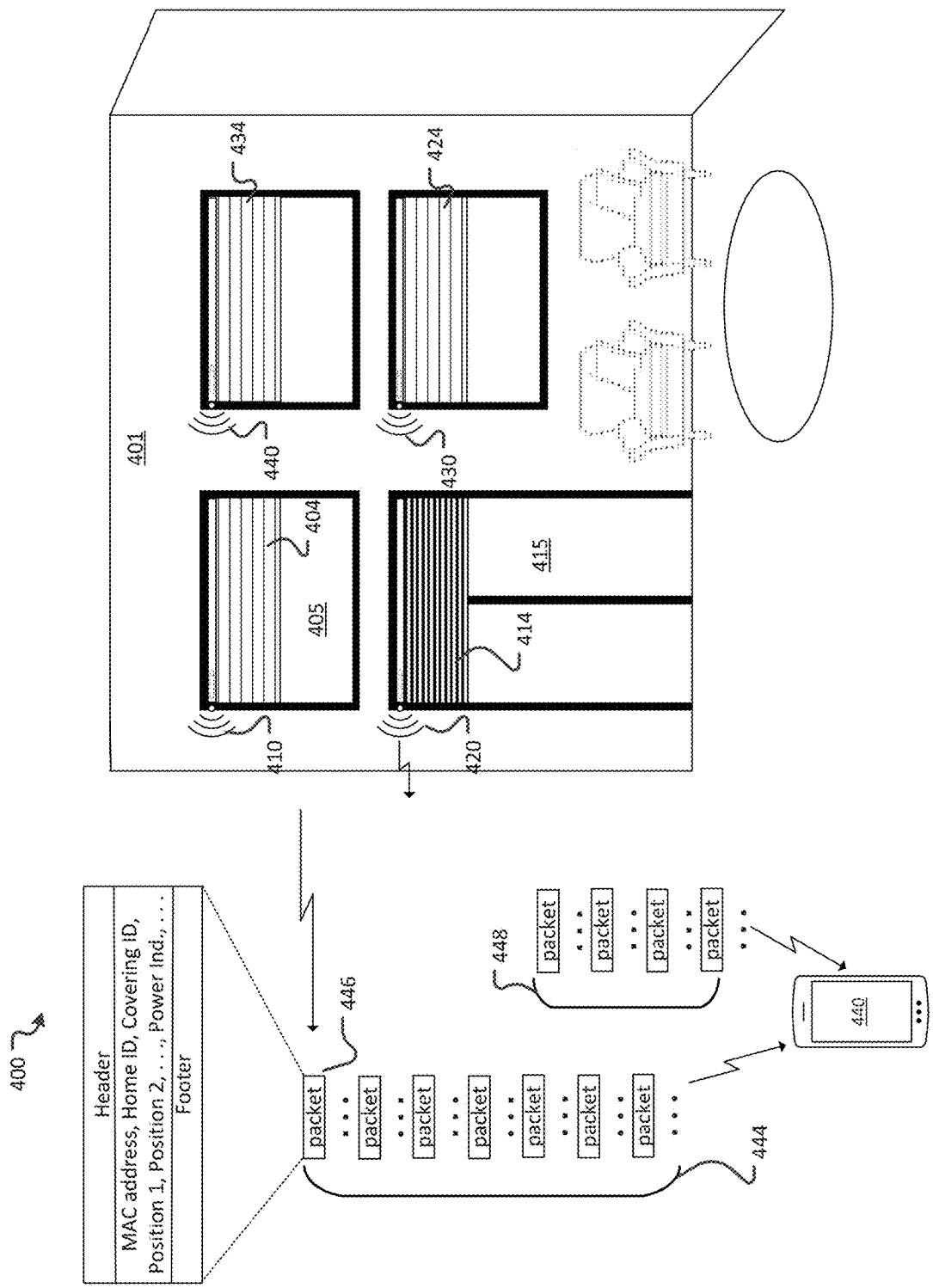
FIG. 4 illustrates exemplary broadcasting functionality in accordance with an aspect of an exemplary architectural structural covering system.

FIG. 4 illustrates the broadcast signals 410, 420, 430, and 440 for each of the coverings 404, 414, 424, and 434 respectively according to exemplary system 400. Generally, a broadcast signal represents a signal that is transmitted at a predetermined interval (or rate) independently of a request from a remote device for data that the broadcast signal can indicate and without being transmitted specifically to a particular remote device. For instance, in the context of packet-based transmissions, rather than using a unicast transmission, the broadcast signal can be broadcasted as one or more packets. A broadcast of a packet includes transmitting the packet from a single source to all possible end destination within reach of a network (e.g., a WiFi network, a Bluetooth network, a Bluetooth Low Energy network, etc.). In comparison, a unicast of a packet includes transmitting the packet from the single source to a single destination. The broadcast signal 426 can be transmitted (e.g., broadcasted) as packets sent at predetermined time intervals, for example, between about four and twelve transmissions per second. In the example, the broadcast signals 410, 420, 430, and 440 includes a header, and informational data of the covering. For example, informational data can include a name or type of the covering. In one example, the name or type of the covering can be an eight-digit code that includes a covering type (e.g., SIL for Silhouette™, PIR for Pirouette™, etc.) and the corresponding serial number or a portion thereof. Additionally or alternatively, the informational data can include a model identification number. The model identification number allows for further characteristics of the type of covering to be determined, such as, but not limited to, a horizontal covering, a vertical covering, tilt functionality, vane position, opacity control, left and right extension/retraction, etc. Generally, the informational data enables the user device 412 to determine the type and/or model of covering, and display the information to the user on the UI.

The broadcast signal 426 also includes information to identify each unique covering in a building, such as a building or home identification number (e.g., home identifier (ID)) and a covering identification number (e.g., covering ID). The home ID can be a unique ID or hash that is associated with the architectural building 402 so that the coverings 404-410 can be associated with a building. This restricts coverings from a neighboring architectural building (e.g., a neighbor's house) from being included within the list 422 on the user device 412. The home identification number may also be used for security within the system 400 as required or desired. The covering identification number allows each covering to be uniquely identified within the building 401.

Additionally, the broadcast signal also includes position information for each covering to identify each possible position of each covering in real time. For example, the covering 100 in FIG. 1 includes three types of position information including the extension/retraction position of the shade panel 102, the tilt position of the vanes 120, and the extension/retraction position of the light blocking panel 150. Although three types of position information are discussed, any number and type of position information is sent in the broadcast signals 410, 420, 430, and 440. As another example, coverings 404, 414, 424, and 434 have two types of position information. The first position identifier is the extension/retraction of the shade panel. The second position identifier is the tilt angle of the vanes within the shade panel. The position information is reported to the user device 440 as percentages of light transmission. For example, the position 1 identifier for covering 404 is 100% because the covering panel is transmitting 100% of the possible light through window 405. The position 2 identifier for shade 404 is 100% because the vanes are perpendicular to the covering panel and then letting in 100% of the available light through that portion of the covering. As another example, the position 1 identifier for shade 414 is 66% because the covering panel is retracted 66% and therefore allowing 66% of available light through the door 415. The position 2 identifier for covering 414 is 100% because the vanes are tilted at 410 degrees and therefore allow 100% of the light through that portion of the covering. The position information in the broadcast signals is updated in real time such that every time any position information is changed for any covering, which changed information is sent out in the next broadcast packet. In this example, a covering can store logic that translates between the extension/retraction position of a shade panel, the tilt position of vanes, and extension/retraction position of the light blocking panel and the percentage of light transmission. For instance, the logic can include a function that correlates the position data with the transparency. The logic can also or alternatively include a table that stores such correlations. In this way, the covering can report either the position data or the percentage of the light transmission. The covering can also receive instructions to move to a certain position, where the instructions can include the position data or the percentage of the light transmission. In the latter situation, the percentage of the light transmission is input to the logic to determine the specific position data that is output of the logic and to control the movement of the shade panel, vanes, and/or light blocking panel. Although up to three types of position information are discussed, it should be appreciated that any number of types of position information is collected and included in the broadcast signals 410, 420, 430, 440. Further, although the position information is transmitted as percentages of light transmission, position information might be recorded in any number of ways, including for example, length, degrees, etc.

The broadcast signal may further include a media access control (MAC) address, battery strength (e.g., battery level) and such further information as may be helpful to identify each covering 404, 414, 424, and 434.

The user device 412 can selectively scan for the broadcast signals 426 (e.g., upon opening the UI application) and receive the broadcast signals 410, 420, 430, 440 from each of the architectural structural coverings 404, 414, 424, and 434. The user device 440 can then determine the positions of each of the coverings from which it receives a signal. The user device may then create a representation of each covering and its position(s) in a user interface in real time that has position information that matches the actual covering's position. As the position information of the covering changes, the position information in the broadcast signal changes accordingly, which causes the user device to use the changed information to real time display the covering's representation in the user interface of the user device. In this way, the position information of the actual covering matches the position information of the covering's representation on the user interface to help users identify which coverings match which UI representations as discussed in more detail in the following figures.

The user device can also determine a signal strength of the broadcast signal 410, 420, 430, 440 for each of the coverings 404, 414, 424, 434 so as to determine proximity thereto. The user device 440, for each broadcast signal, measures the power present in the received signal to generate a Received Signal Strength Indicator (RSSI) value. The RSSI value is then smoothed to obtain a relative proximity value to other architectural structural coverings.

Figures 5A, 5B:
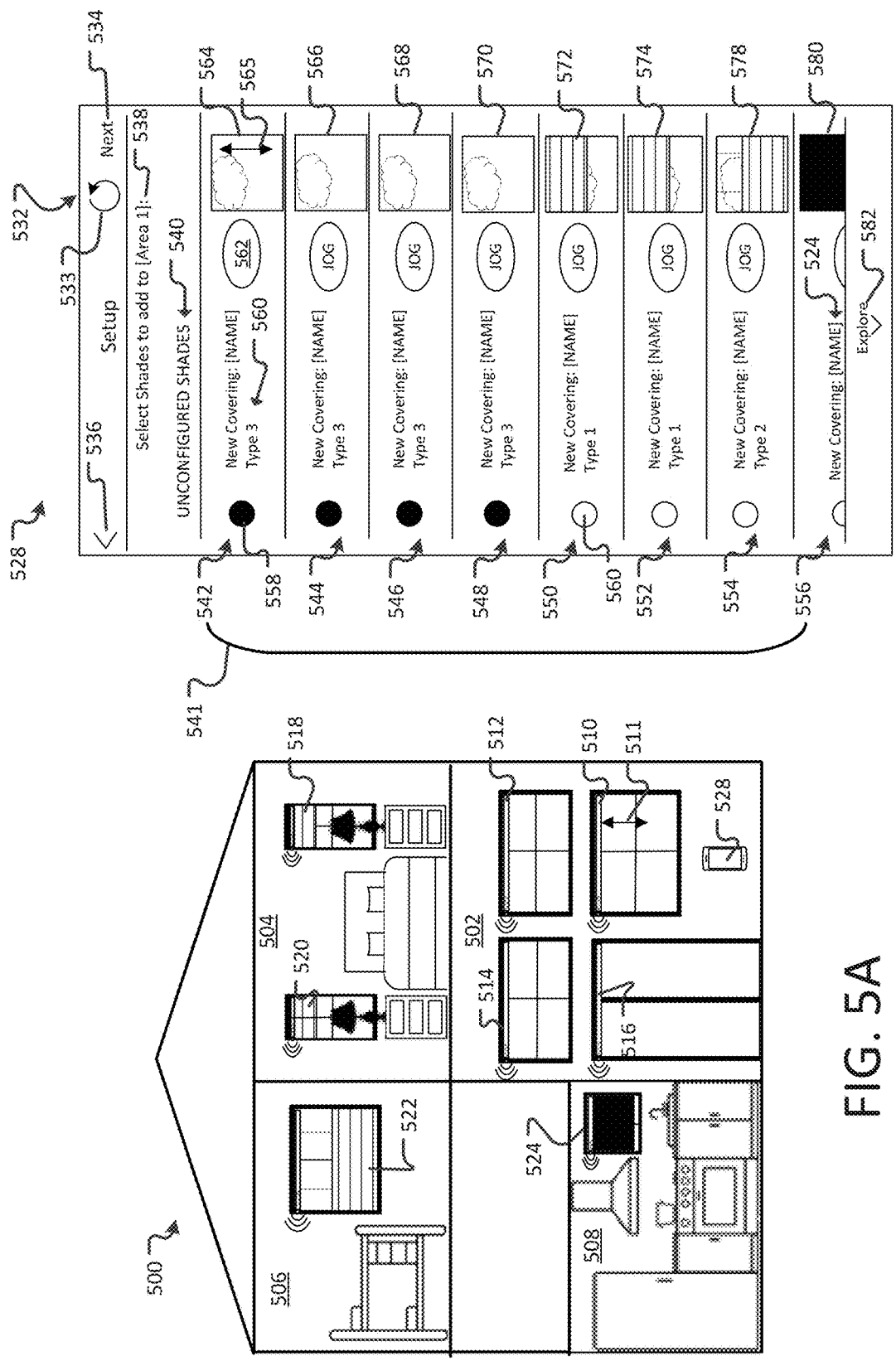
FIGS. 5A and 5B are an exemplary architectural structural covering system in a set up-based environment.

As illustrated in FIGS. 5A and 5B, the user device 528 is in a set up mode to configure the UI for unassociated coverings in building 500. Building 500 has four areas 502, 504, 506, and 508 with eight coverings 510-524. The set up configuration can be used when the user or an installer is initially configuring the user device 528 for operational control of the architectural structural coverings 510-524 and further use. Once the user device 528 determines the signal strength of each of the broadcast signals from the coverings 510-524, the user device 528 generates an ordered list 541 of entries 542-556 corresponding to the coverings 510-524 on a UI 532 based on the signal strength of the signals (such as broadcast signals 444 and 448 in FIG. 4). The ordered list 541 can then be at least partially displayed on the UI 523 of the user device 528. In certain aspects, the user device 528 will limit the ordered list to those coverings that include the same home ID within the broadcast or advertising packets and exclude any coverings that have a home ID that does not match the other's home IDs.

The UI has standard controls such as a back control 536, an undo control 533, and a Next control 534 (discussed later). If all the coverings in the building will not fit on UI 532, a scroll control 582 allows a user to scroll down to view all of the coverings that have been detected by user device 528. For example, entry 556 is only partially displayed but may be fully displayed by selecting scroll control 582.

The set up UI 532 includes the option to assign certain coverings to certain areas. For example, UI 532 displays the option 538 select coverings for area 1, which includes a free next field to allow the user to name area 1 as he or she chooses. For example, the user may change "[Area 1] to say "family room" or any other description the user chooses.

Each entry 542-546 in the list 541 includes a selection control 558, an identifier 560, a selectable jog control 562, and a representation 564 of the covering it is associated with. The identifier 560 includes a covering name and/or covering type (e.g., blind, shade, shutter). The [name] field in the identifier 560 may be a free text box that allows a user to give a name (e.g., Living Room 1) and may be automatically populated using the area name plus an index. Alternatively, the name field includes a selection control that allows a user to select a number to identify the area and/or a number to identify the covering. The position of the covering representations 564-580 match the actual positions of the coverings 510-524 with which they are associated.

The type of the covering for each representation 564-580 in the UI 532 matches the actual covering with which it is associated. For example, covering 524 is a blackout shade and its representation 580 is also a blackout shade. Covering 522 is a bottom up shade and is represented as such in entry 554. Similarly, the position(s) of each covering are updated in real time in the representations 564-580 on the UI 532 of the user device 528 so that they are always the same as shown by comparing coverings 510-524 with representations 564-580. In this way, it is easier and quicker for a user and/or installer to configure the user device 528 to remotely operate the coverings 510-524. For example, coverings 518, 520 are similar type to covering 50 shown in FIG. 1. Their representations 572, 574 match their type. Further, the positions of coverings 518, 520 are 100% extend/contract and 100% for the vanes. Their representations 572, 574 match their type.

The ordered list 543 can be ordered by the proximity (e.g., distance) of each covering to the user device 528 and include names 560 and/or types of each of the coverings grouped therein. For example, because the user device 528 is located in area 502, it may represent coverings 510-514 in that area at the beginning of the ordered list. Covering 522 in area 506 is furthest from user device 528 so it is last on the list 543. However, it still is difficult to determine which list entry 542-548 corresponds to which covering 510-514. This is particularly true if all of the coverings are retracted as shown in area 502.

One way to determine which covering matches which UI covering representation is to select the jog control 562, which causes the covering 510 to extend/contract in cycles as shown by arrow 511 in FIG. 5A. The cyclic movement of the actual position of covering 510 causes its representation 564 to also extend/contract in the same way as the covering 510 through the use of advertising packets sent in real-time as described with reference to FIG. 4. In this way, a user will be able to see that covering 510 matches entry 542 because both are moving the same way at the same time. Indeed, the actual positions of covering 510 and representation 564 will be identical during the jog such that when covering 510 is at 100% so too is representation 564. When covering 510 is at 100%, so too is representation 546. Further, the representation 564 will move in the same way at the same time as the covering 510. This is accomplished through the real-time broadcast feature discussed with regard to FIG. 4. Once the user or installer understands that covering 510 matches representation 564, and therefore entry 542, the user/installer may choose a name for covering 510, such as the number 2. These operations are repeated with entries 544, 546, and 548, where the user may opt to name the coverings as 1-4 starting from left to right on the bottom row, and then left to right on the top row.

Once a user has determined that coverings 510-514 are in area 502 and named the [Area] field 538, a user may select the selection control 558 for entries 542-548 to assign coverings 510-516 to area 502 on the UI 532. The user may then select the Next control 534 to repeat the process for each area in the building 500. Thereafter, the user may remotely control coverings 510-516 using the covering names and area names created through this set up UI 532.

Figure 6A:
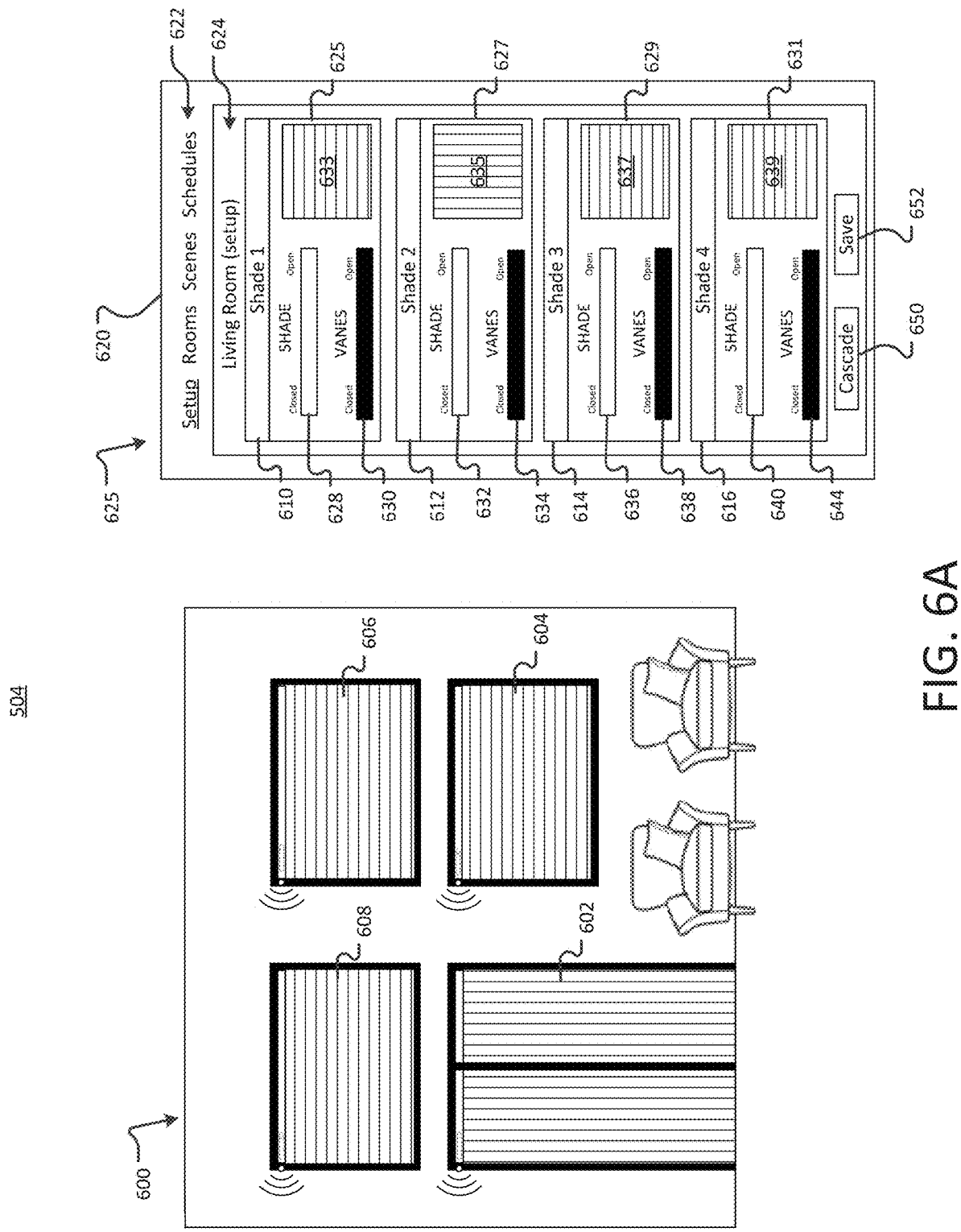
FIGS. 6A, 6B, and 6C are an exemplary architectural structural covering system in a set up-based environment.
Figure 6B:
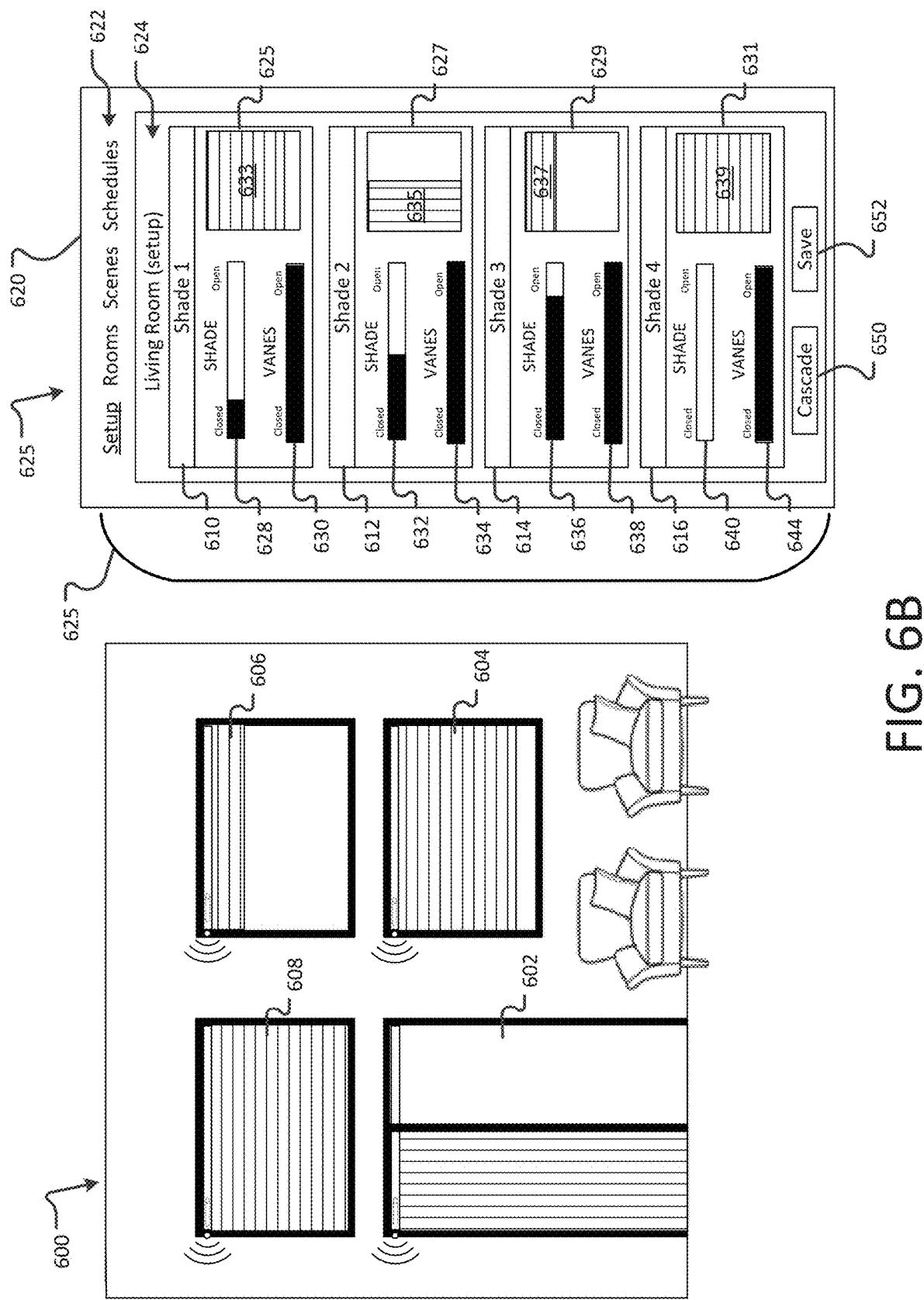
Figure 6C:
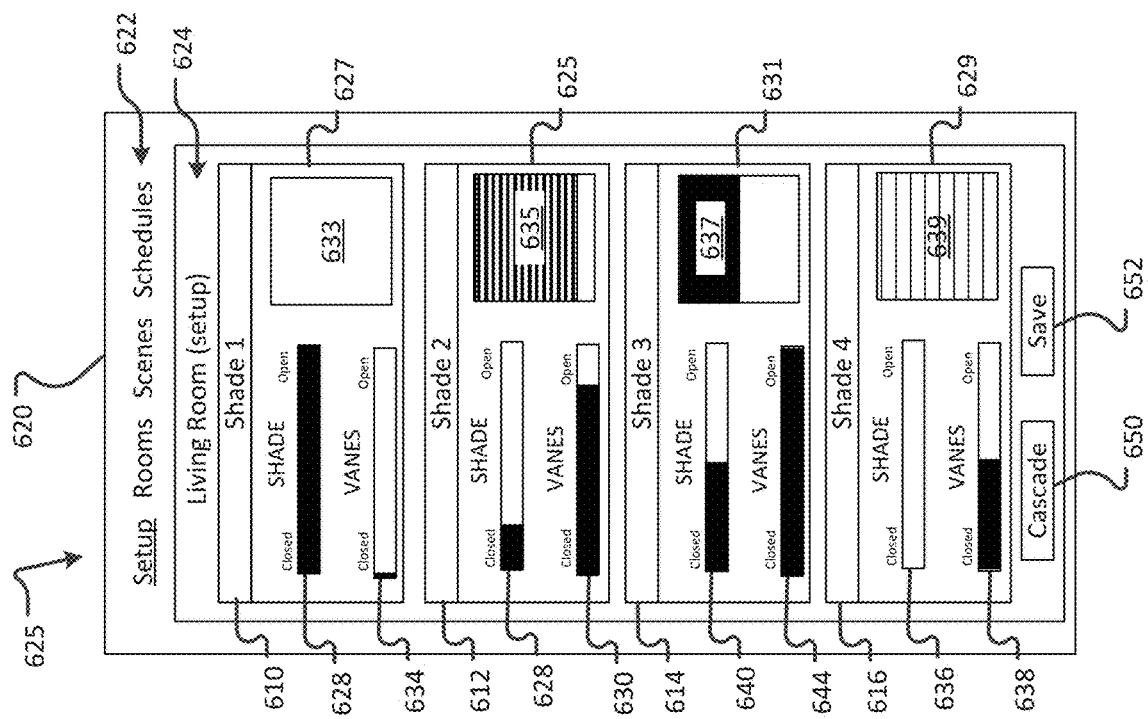
Figure 6C:
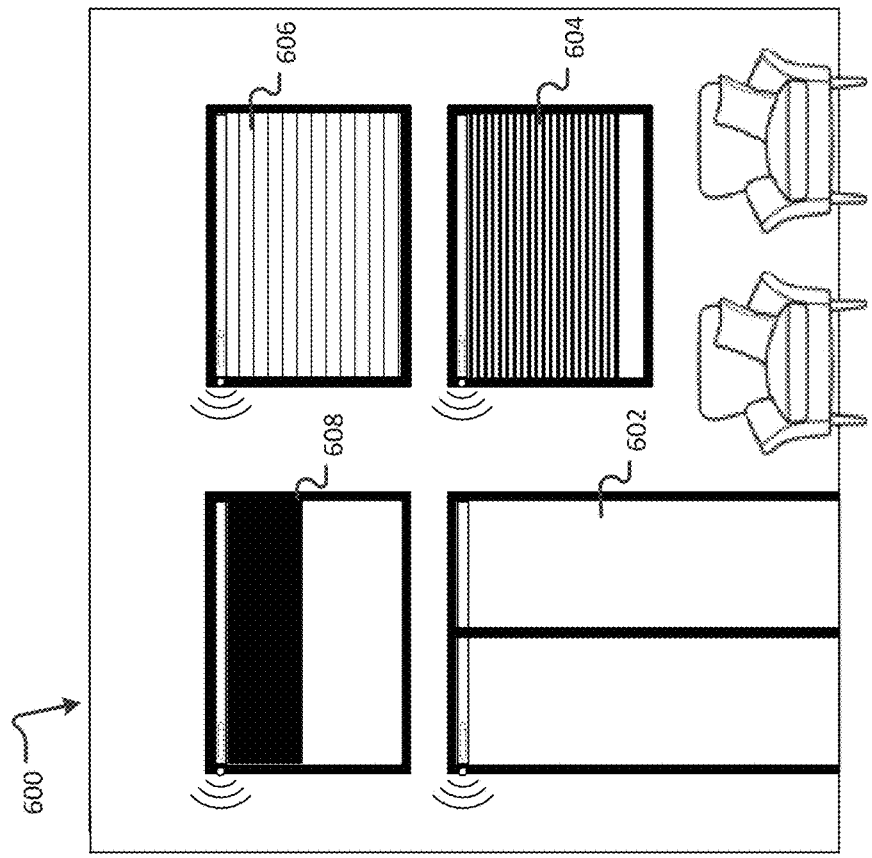

FIGS. 6A, 6B, and 6C illustrate an alternative set up user interface 620 for user device 625 to configure the UI 620 for unassociated coverings in building 600. Building 600 has four coverings 602, 604, 606, 608. The set up configuration can be used when the user or an installer is initially configuring the user device 625 for operational control of the architectural structural coverings 602, 604, 606, 608 and further use. Once the user device 625 determines the signal strength of each of the broadcast signals from the coverings 602, 604, 606, 608, the user device 625 generates an ordered list 625 of entries 625, 627, 629, 631 corresponding to the coverings 602, 604, 606, 608 on a UI 620.

The UI 620 may have different menu options 622 such as a "rooms" menu that allows a user to select a room and control the coverings in the selected rooms (once they have been configured), a Scenes menu that allows users to program different patterns of behavior for each of the configured coverings (such as "morning," "evening", "movie time", etc.) once the coverings have been configured, and a Schedules menu that allows users to configure schedules for each of the configured coverings.

The set up UI 620 includes the option to assign certain coverings to certain areas. For example, UI 620 displays the option 624 configure coverings for a first area, such as a living room, which includes a free next field to allow the user to name the area (e.g., living room) as he or she chooses. The UI 620 may be accessed from the Next control 534 in FIG. 5B or may be accessed directly from the Set up menu option 622 or from another UI menu, control, or window.

UI 620 includes an ordered list of UI covering names 610, 612, 614, 616, which may be identified by number in ascending order (e.g., 1, 2, 3, 4) or includes a text field that allows the user to name the covering how he or she desires. Below each covering ID 626, 628, 630, 632 is a covering entry 625, 627, 629, 631 that is presently associated with the UI covering name. These associations may be changed as described in more detail below.

Each entry 625, 627, 629, 631 includes a position control for each changeable position of each covering. The position controls may be any type of UI control such as a slide bar (shown in FIG. 6A), a free text box to enter a position value, a scroll control and the like. For example, the coverings 602, 604, 606, 608 have two position controls—a covering extension/retraction control 628, 632, 636, and 640 and a vane control 630, 634, 638, 644. Sliding the controls to the right causes the positions to transmit more light and sliding the controls left causes them to transmit less light. As shown in FIG. 6A, the position of the extension/retraction control is at 0% (e.g., closed or transmitting the least amount of light) for all coverings 602, 604, 606, 608 and the position of the vane control is at 100% (e.g., open or transmitting the most amount of light) for all coverings 602, 604, 606, 608. Each entry 625, 627, 629, 631, also includes a representation 633, 635, 637, 639 of the covering 602, 604, 606, 608 that it is associated with. The position of the covering representation 633, 635, 637, 639 match the actual positions of the coverings 602, 604, 606, 608 with which they are associated. These position controls are updated live (e.g., in real time) using the broadcast method described with reference to FIG. 4.

However, because all four coverings 602, 604, 606, 608 are located in the same position it is difficult to determine which covering matches which entry 625, 627, 629, 631. A way to determine which covering matches which UI covering representation is to select the cascade control 650, which causes each of the coverings 602, 604, 606, 608 represented in the UI 620 to change to a different position as is shown in FIG. 6B.

FIG. 6B illustrates the results of selecting the cascade control 650 in FIG. 6A. Instead of all of the coverings 602, 604, 606, 608 and their representations 633, 635, 637, 639 having an extension/retraction position of 0% and a vane position of 100%, each is now different. Covering 602 has an extension/retraction position of 0% and a vane position of 100%. UI 620 shows that representation 635 for entry 627 matches this position information. From this the user/installer may determine that covering 602 matches or corresponds to entry 627. Likewise, covering 604 has an extension/retraction position of 20% and a vane position of 100%. UI 620 shows that representation 633 for entry 625 matches this position information. From this the user/installer may determine that covering 604 matches or corresponds to entry 625. Covering 606 has an extension/retraction position of 70% and a vane position of 100%. UI 620 shows that representation 637 for entry 629 matches this position information. From this the user/installer may determine that covering 606 matches or corresponds to entry 629. Covering 608 has an extension/retraction position of 0% and a vane position of 100%. UI 620 shows that representation 639 for entry 631 matches this position information. From this the user/installer may determine that covering 608 matches or corresponds to entry 631.

The user may change the order of the entries to line up as he or she desires by dragging and dropping the entries 625, 627, 629, and 631 to connect to the UI covering names 610, 612, 614, 616. For example the user may wish to order the coverings in a left/bottom to top/right configuration or any other order the user desires. Once the user has rearranged the pairings of the covering names with the entries, the user may store this information in the user device 625 by selecting the save control 652.

Accordingly, the systems and methods described herein are used to determine the proximity (e.g., distance) of each of the architectural structural coverings 404-410 from the user device 412. This enables the device 412 to generate an ordered list 422 of the coverings and display the list 422 on a display screen 444 having a user interface (UI) so that the user can quickly and easily select nearby coverings for operational control thereof.

FIG. 6C illustrates the results of a user rearranging the association of the covering names with the covering entries in UI 620 to follow a bottom right to left, then top right to left order. Now covering 602 is identified as covering 1 610 (instead of covering 2 612), covering 604 is identified as covering 2 612 (instead of covering 1 610), covering 608 is identified as covering 3 614 (instead of covering 4 616) and covering 606 is identified as covering 4 616 (instead of covering 3 614).

The user/installer may test the configuration set up by manipulating the position controls as shown in FIG. 6C. Moving the position controls in UI 620 causes the associated coverings 602, 604, 606, 608 to move in real time to match their associated representations 633, 635, 637, 639 as changed by the user's manipulation of the associated position controls.

For covering 1 610, the position 1 control was moved from 20% to 100% and the position 2 control was moved from 100% to 0%. The covering 602 and its representation 633 moved in real-time to match the positions selected on UI 620. From this information, the user may confirm that covering 1 610 matches covering 602. For covering 2 612, the position 1 control was not changed but the position 2 control was moved from 100% to 80%. The covering 604 and its representation 635 moved in real-time to match the positions selected on UI 620. From this information, the user may confirm that covering name 1 612 matches covering 604. For covering 3 614, the position 1 control was moved from 0% to 100% and the position 2 control was moved from 100% to 0%. The covering 608 and its representation 635 moved in real-time to match the positions selected on UI 620. From this information, the user may confirm that covering name 3 614 matches covering 608. For covering 4 616, the position 1 control was moved from 70% to 0% and the position 2 control was not changed. The covering 606 and its representation 635 moved in real-time to match the positions selected on UI 620. From this information, the user may confirm that covering name 4 614 matches covering 606. In this way, the real-time of positions of the coverings with the positions of the UI representations of the coverings made it easier and quicker for a user and/or installer to set up the remote operation configuration of coverings 602, 604, 606, and 608.

Figure 7:
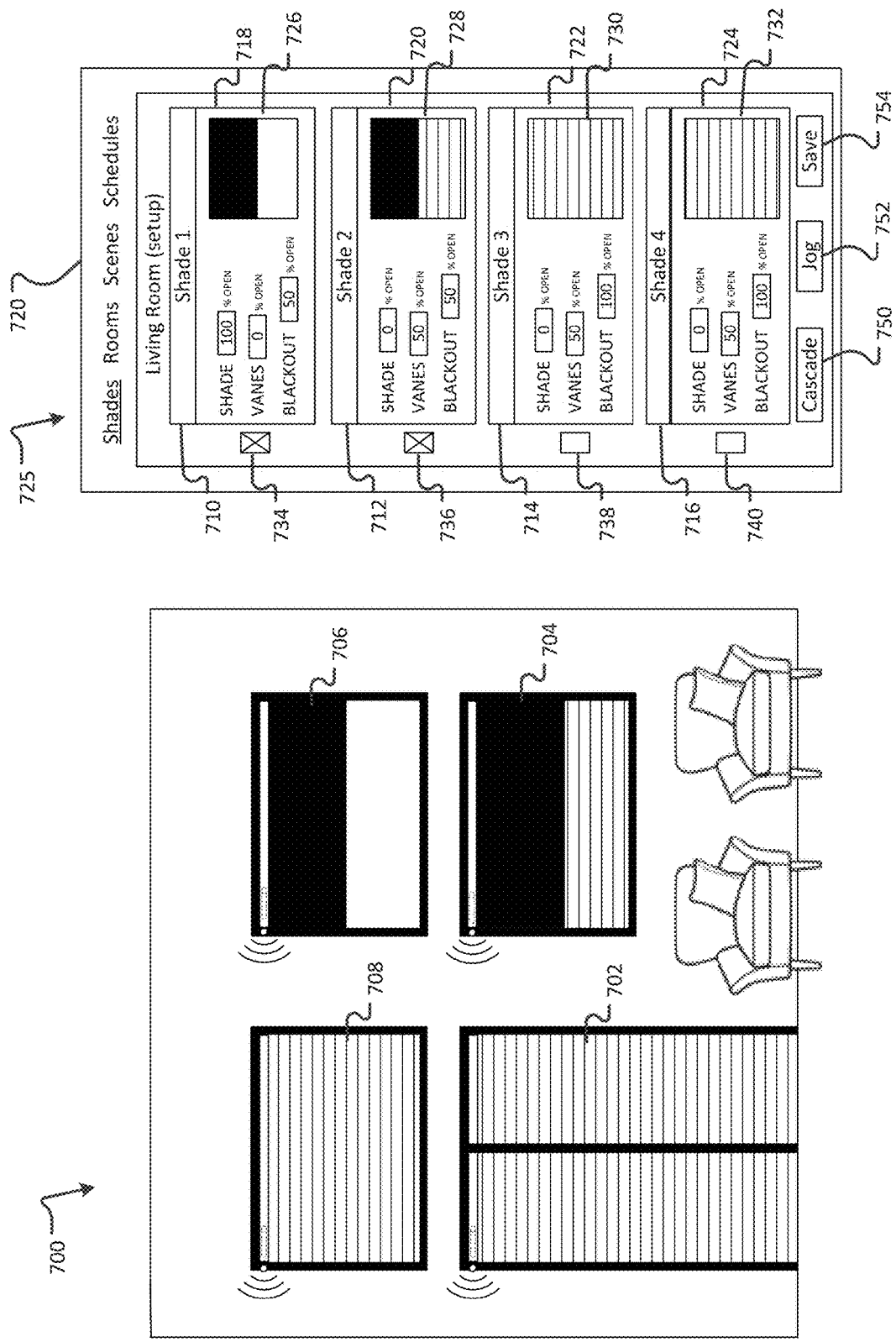
FIG. 7 is an exemplary architectural structural covering system in a set up-based environment.

FIG. 7 illustrates an alternative set up user interface 720 for user device 725 to configure the UI 720 for unassociated coverings in building 700. Building 700 has four coverings 702, 704, 706, 708. The set up configuration can be used when the user or an installer is initially configuring the user device 725 for operational control of the architectural structural coverings 702, 704, 706, 708 and further use. The user device 728 generates a list of entries 718, 720, 722, 724 corresponding to the coverings 702, 704, 706, 708 on a UI 720.

UI 720 includes a list of UI covering names 710, 712, 714, 716, which is identified by number in ascending order (e.g., 1, 2, 3, 4) or includes a text field that allows the user to name the covering how he or she desires. Below each covering name is a covering entry 718, 720, 722, 724 that is presently associated with the UI covering name. These associations may be changed as described in detail above in FIGS. 6A, 6B, 6C.

Each entry 718, 720, 722, 724 includes a position control for each changeable position of each covering. The position controls may be any type of UI control such as a slide bar (shown in FIG. 6A), a free text box to enter a position value (shown in FIG. 7), a scroll control, and the like. For example, the coverings 702, 704, 706, 708 have three position controls—a covering extension/retraction control (labeled SHADE in entries 718, 720, 722, 724), a vane control (labeled VANES in entries 718, 720, 722, 724), and a blocking panel control (labeled BLACKOUT in entries 718, 720, 722, 724). Users may enter numerical values into text boxes associated with these three types of controls. In an aspect, a user may enter a numerical percentage to signify the amount of light that will be transmitted for each position control. Other options are possible.

Each entry 718, 720, 722, 724, also includes a representation 726, 728, 730, 732 of the covering 702, 704, 706, 708 that it is associated with. The position of the covering representation 726, 728, 730, 732 match the actual positions of the coverings 702, 704, 706, 708 with which they are associated. These position controls are updated live (e.g., in real time) using the broadcast method described with reference to FIG. 4.

UI 720 also includes a selection control 734, 736, 738, 740 for each entry 718, 720, 722, 724, and a cascade control 750, a jog control 752, and a save control 754, which operate as described in FIGS. 5A, 5B, 6A, 6B, and 6C. The selection controls 734, 736, 738, 740 may be used in conjunction with the cascade control 750 and/or the jog control 752 to cause a position cascade or position jog of less than all the covering entries shown in UI 720. For example, FIG. 7 shows the results of a user selecting entries 718 and 720 followed by a selection of the cascade control 750. This allows the user to determine that covering 706 is associated with entry 718 because the positions changed on both the covering 706 and representation 726 of entry 718 at the same time and ended up in the same position, namely with the SHADE position at 100%, the VANES position at 0%, and the opacity control position at 100%. Similarly, the user may determine that covering 704 is associated with entry 720 because the positions changed on both the covering 704 and representation 728 of entry 720 at the same time and ended up in the same position, namely with the SHADE position at 0%, the VANES position at 100%, and the BLACKOUT position at 100%.

In the above figures, jog and cascade motions are described. Other motion types can be likewise defined and used, including cyclic and non-cyclic motions. Generally, a covering can receive one or more instructions from a device indicating a motion of the covering. Via one or more motors, or other controls of the covering, the motion can be caused and performed. As the motion is being performed, the covering determines new position data and transmits a broadcast signal with the new position data. In turn, the device receives the broadcast signal, determines the new position data, updates the representation of the covering to mirror the new position data. The covering can store logic that translates between a motion and position data. For a motion that includes multiple points, the logic can define position data for each point and timing and/or speed of the motion between pairs of the points. For instance, the logic can include a table associated with an identifier of the motion and that lists the different positions and timing and/or speed. An instruction received from the deice can include the motion's identifier. The covering inputs this identifier to the logic and determines the position data as the output of the logic (e.g., the motion's identifier is used in a look-up of the table). The position data is then used to control the movement of the shade panel, vanes, and/or light blocking panel of the covering.

Figure 8:
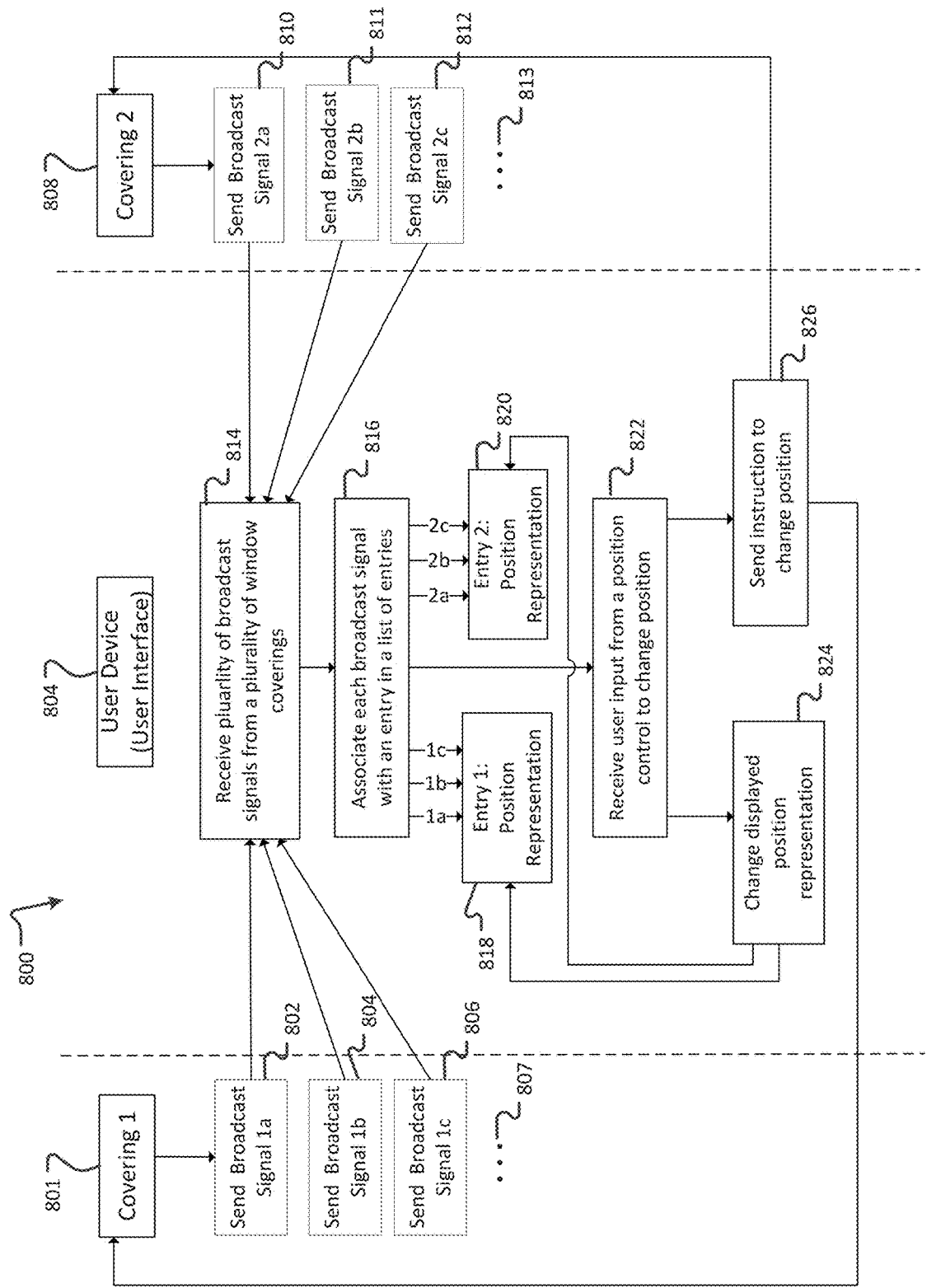
FIG. 8 is a flowchart illustrating an exemplary method for configuring a user device to remotely control a plurality of installed architectural structural coverings.
Figure 10:
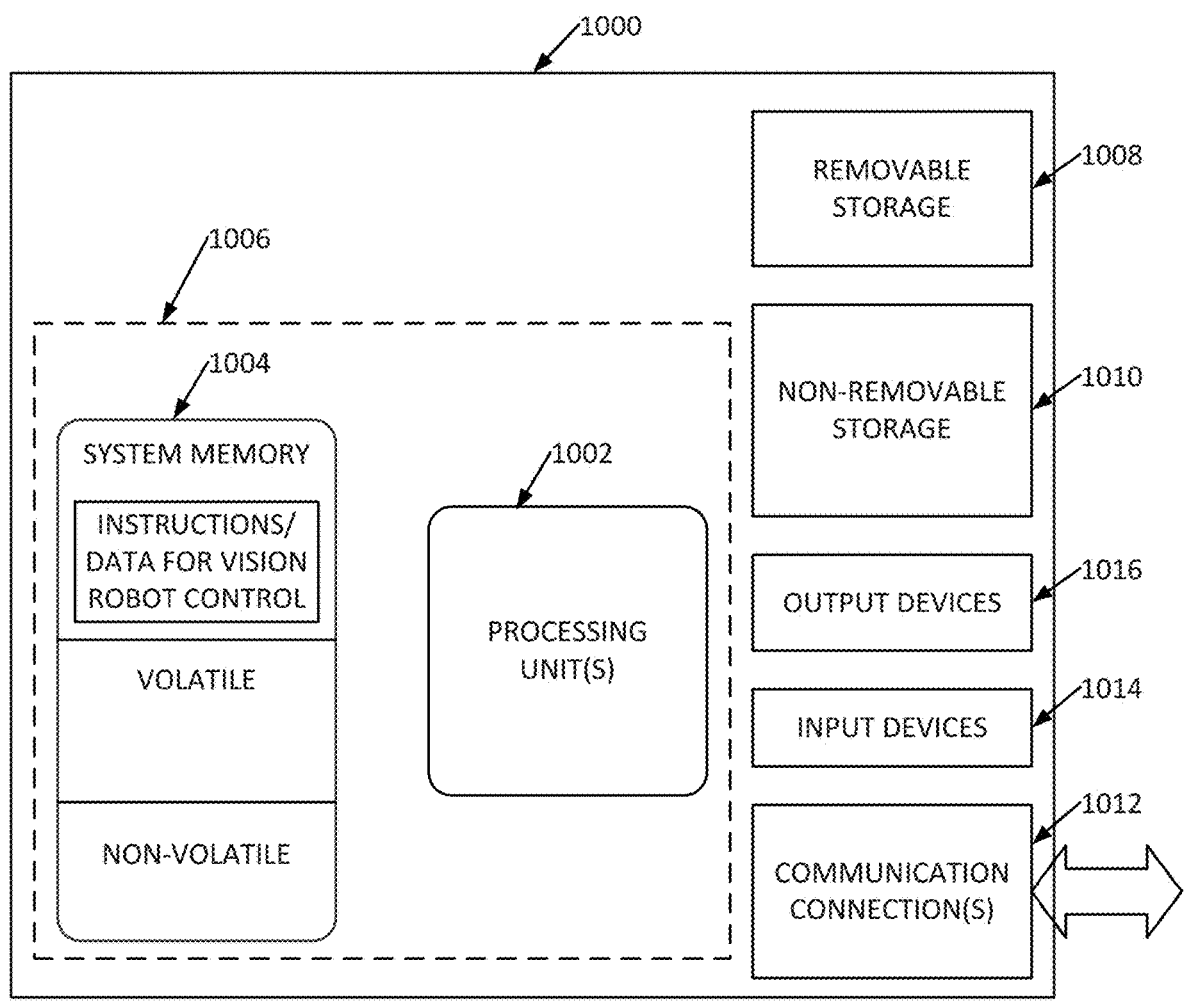
FIG. 10 is a block diagram of an exemplary operating environment in which one or more of the present examples may be implemented.

FIG. 8 is a flowchart illustrating an exemplary method 800 for configuring a user interface for remote control of a plurality of architectural structural coverings. The method 300 is performed by a user device, such as the user device 312 (FIG. 3), 440 (FIG. 4), 528 (FIG. 5), 625 (FIGS. 6A-6C), 725 (FIG. 7), 1000 (FIG. 10). The method 300 begins at operations 801 and 808, where the broadcast signals 1a 802, 1b 804, 1c 806 are transmitted from architectural structural covering 1 801 and broadcast signals 2a 810, 2b 811, and 2c 812 are transmitted from architectural structural covering 2 808 The broadcast signal is transmitted at predetermined time intervals that are ongoing as depicted by ellipses 807, 813 and include informational data, position data, power transmission data, and/or a home identification of the respective architectural structural covering as described herein, particularly with reference with FIG. 4. As explained herein above, the position data can include actual position(s) of a panel and/or vane of a covering. Additionally or alternatively, the position data can include a percentage of light transmission, in which case the actual position can be translated by the covering into the percentage of light transmission.

Moving to operation 814 the broadcast signals from coverings 1 801 and 2 808 are received at user device 804. At operation 816, the user device associates each broadcast signal 1*a*-1*c* and 2*a*-2*c* an entry in a list of entries, such as those shown herein, based on a covering ID that is sent as part of a broadcast packet that is sent with the broadcast signal as described herein. At operation 818, the broadcast signals associated with covering 1 are inserted into entry 1. At operation 820, the broadcast signals associated with covering 2 are inserted into entry 2. More particularly, the position information that is sent as part of each broadcast packet is used to display a representation of the covering that matches the covering ID in broadcast signal. At operation 822, input from a user control to change position of coverings 1 and 2 is received at the user interface. The user interface control might be cascade control (650 in FIGS. 6A-6C or 750 in FIG. 7) or a jog control (562 in FIG. 5B or 752 in FIG. 7) or some other position control that allows for moving more than one covering at a time. In response to operation 822, operation 824 changes the displayed position representation in Entry 1 and Entry 2. Simultaneously, operation 826 sends an instruction to change the physical position of covering 1 801 and covering 2 808 such that the positions of the position representations mirror the physical positions of the associated coverings. As illustrated with the loop between operation 826 to covering 801 and operation 826 to 808, each of the coverings receives one or more instructions from the user device 804. An instructions can include an identifier of a motion (e.g., jog, cascade). This identifier can be input to a logic of a covering, where the logic outputs position data for controlling the covering.

Figure 9:
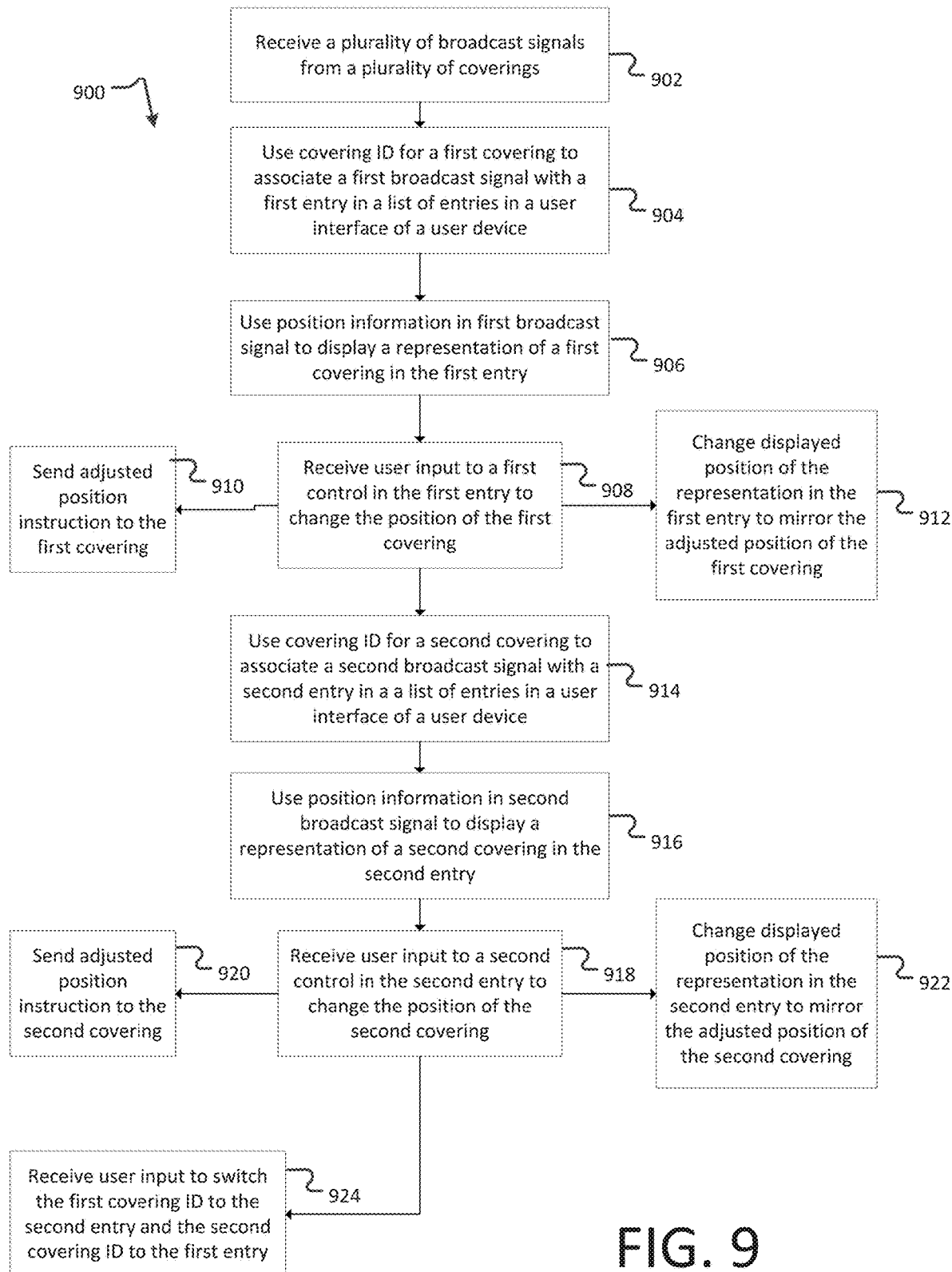
FIG. 9 is a flowchart illustrating an exemplary method for configuring a user device to remotely control a plurality of installed architectural structural coverings.

FIG. 9 is a flowchart illustrating an exemplary method 900 for configuring a user interface for remote control of a plurality of architectural structural coverings. The method 900 is performed by a user device, such as the user device 312 (FIG. 3), 440 (FIG. 4), 528 (FIG. 5), 625 (FIGS. 6A-6C), 725 (FIG. 7), 1000 (FIG. 10). The method 900 begins at operation 902. The method 900 proceeds to operation 904 where the covering ID for a first covering is associated with a first entry in a list of entries in a user interface of a user device as described in FIGS. 5A and 5B and 6A-6C. At operation 906, position information included in the first broadcast signal is used to create and display a representation of the first covering in the first entry. Next at operation 908, a user input is received at a position control within the first entry to change the position of the first covering. This causes operations 910 and 912 to happen simultaneously. At 910, an adjusted position instruction is sent to the first covering. At 912, the displayed position representation in the first entry is changed to mirror the adjusted position of the first covering.

At operation 914 where the covering ID for a second covering is associated with a second entry in a list of entries in a user interface of a user device as described in FIGS. 5A and 5B and 6A-6C. At operation 916, position information included in the second broadcast signal is used to create and display a representation of the second covering in the second entry. Next at operation 918, a user input is received at a position control within the second entry to change the position of the second covering. This causes operations 920 and 922 to happen simultaneously. At 920, an adjusted position instruction is sent to the second covering. At 922, the displayed position representation in the second entry is changed to mirror the adjusted position of the second covering. At operation 924, user input, such as a drag and drop, is received to switch the first covering ID to the second entry and the second covering ID to the first entry.

FIG. 10 is a block diagram of an exemplary operating environment 1000 in which one or more of the present examples may be implemented. For example, the architectural structural covering controller 142 (shown in FIG. 2) and/or the user device 312 (FIG. 3), 440 (FIG. 4), 528 (FIG. 5), 625 (FIGS. 6A-6C), 725 (FIG. 7). This is only one example of a suitable operating environment and is not intended to suggest any limitation as to the scope of use or functionality. Other well-known computing systems, environments, and/or configurations that are suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 1000 typically includes at least one processing unit 1002 and memory 1004. Depending on the exact configuration and type of computing device, memory 1004 (instructions to perform aspects disclosed herein) may be volatile (such as RAM), non-volatile (such as ROM, flash memory, etc.), or some combination of the two. This most basic configuration is illustrated in FIG. 10 by dashed line 1006. Further, environment 1000 may also include storage devices (removable, 1008, and/or non-removable, 1010) including, but not limited to, magnetic or optical disks or tape. Similarly, environment 1000 may also have input device(s) 1014 such as keyboard, mouse, pen, voice input, etc. and/or output device(s) 1016 such as a display, speakers, printer, etc. Also included in the environment may be one or more communication connections, 1012, such as LAN, WAN, point to point, etc.

Operating environment 1000 typically includes at least some form of computer readable media. Computer readable media can be any available media that can be accessed by processing unit 1002 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data buildings, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media.

Communication media embodies computer readable instructions, data buildings, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer readable media.

The operating environment 1000 may be a single computer operating in a networked environment using logical connections to one or more remote computers. The remote computer may be a personal computer, a server, a router, a network PC, a peer device, or other common network node, and typically includes many or all of the elements described above as well as others not so mentioned. The logical connections includes any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system for configuring a user device to remotely control a plurality of architectural structural coverings, the system comprising:
a processor; and
a memory storing computer executable instructions that, when executed by the processor, cause the processor to:
receive a plurality of broadcast signals from a plurality of architectural structural coverings, wherein each individual broadcast signal is associated with an individual architectural structural covering and relays position information for the individual architectural structural covering;
associate a first broadcast signal with a first entry in a list of entries displayed on a user interface of the user device, wherein the first entry comprises:
a representation of a first architectural structural covering having a displayed position that matches position information from the first broadcast signal; and
a position control for controlling a physical position of the first architectural structural covering;
receive user input via the position control for the representation of the first architectural structural covering;
based on the user input, send an adjusted position instruction to the first architectural structural covering; and
simultaneously change the displayed position of the representation of the first architectural structural covering to mirror a change in the physical position of the first architectural structural covering.

2. The system of claim 1, wherein the memory stores further computer executable instructions that, when executed by the processor, cause the processor to:
receive a selection from a user of a jog control associated with the first entry;
in response to the selection, send an instruction to the first architectural structural covering to move in a cyclic motion; and
simultaneously change the displayed position of the representation of the first architectural structural covering to mirror the cyclic motion of the first architectural structural covering.

3. The system of claim 2, wherein the cyclic motion is extension/retraction.

4. The system of claim 1, wherein the memory stores further computer executable instructions that, when executed by the processor, cause the processor to receive a user selection to add a name to the first entry associated with the first architectural structural covering.

5. The system of claim 1, wherein the position information relayed by the plurality of broadcast signals is measured in percentages.

6. The system of claim 1, wherein the user device is at least one of a mobile device or a proprietary controller.

7. The system of claim 1, wherein the first architectural structural covering is a window covering.

8. The system of claim 1, wherein the first broadcast signal further relays a covering identifier, and a home identifier.

9. The system of claim 8, wherein each of the plurality of architectural structural coverings have the same home identifier.

10. The system of claim 1, wherein the memory stores further computer executable instructions that, when executed by the processor, cause the processor to:
associate a second broadcast signal with a second entry in the list of entries displayed on the user interface of the user device, wherein the second entry comprises:
a representation of a second architectural structural covering having a displayed position that matches position information from the second broadcast signal; and
a position control for controlling a physical position of the second architectural structural covering;
receive additional user input via the position control for the representation of the second architectural structural covering;
based on the additional user input, send an adjusted position instruction to the second architectural structural covering; and
simultaneously change the displayed position of the representation of the second architectural structural covering to mirror a change in the physical position of the second architectural structural covering.

11. The system of claim 1, wherein the first broadcast signal further relays multiple types of position information for the first architectural structural covering.

12. A method for configuring a user device to remotely control a plurality of architectural structural coverings, the method comprising:
receiving a first broadcast signal from a first architectural structural covering, the first broadcast signal indicating a first covering identifier and first position information for the first architectural structural covering;

receiving a second broadcast signal from a second architectural structural covering, the second broadcast signal indicating a second covering identifier and second position information for the first architectural structural covering;

associating the first broadcast signal with a first entry a list of entries displayed in a user interface of the user device based on the first covering identifier, wherein the first entry comprises a first position control for controlling a first position of the first architectural structural covering and a representation of the first architectural structural covering having a displayed position that matches the first position information from the first broadcast signal;

associating the second broadcast signal with a second entry the list of entries displayed in the user interface of the user device based on the second covering identifier, wherein the second entry comprises a second position control for controlling a second position of the second architectural structural covering and a representation of the second architectural structural covering that matches the second position information from the second broadcast signal;

receiving user input to a third position control displayed in the user interface of the user device;

based on the user input, simultaneously:
sending a first adjusted position to the first architectural structural covering;
sending a second adjusted position to the second architectural structural covering, wherein the first adjusted position is different from the second adjusted position;
changing the displayed position of the representation of the first architectural structural covering to mirror a change in a physical position of the first architectural structural covering; and
changing the displayed position of the representation of the second architectural structural covering to mirror a change in a physical position of the second architectural structural covering.

13. The method of claim 12, wherein the first position information for the first architectural structural covering is measured in percent.

14. The method of claim 12, wherein the first position information for the first architectural structural covering indicates at least one: an extension or retraction of a panel of the first architectural structural covering, or a tilt of a vane of the first architectural structural covering.

15. The method of claim 14, wherein the first adjusted position to the first architectural structural covering adjusts the tilt in the first architectural structural covering.

16. The method of claim 12, wherein the first adjusted position to the first architectural structural covering adjusts extension/retraction of a panel of the first architectural structural covering.

17. The method of claim 12, further comprising:
receiving additional user input to change an association of the first covering identifier to the second entry and the second covering identifier to the first entry.

18. The method of claim 17, wherein the user input comprises drag and drop.

19. A method for configuring a user device to remotely control a plurality of architectural structural coverings, the method comprising:
receiving a plurality of broadcast signals from a plurality of architectural structural coverings, wherein each individual broadcast signal is associated with an individual architectural structural covering and relays position information for the individual architectural structural covering;
associating a first broadcast signal with a first entry in a list of entries displayed on a user interface of the user device, wherein the first entry comprises:
a representation of a first architectural structural covering having a displayed position that matches position information from the first broadcast signal; and
a position control for controlling a physical position of the first architectural structural covering;
receiving user input via the position control for the representation of the first architectural structural covering;
based on the user input, sending instruction to the first architectural structural covering to cycle a physical position of the first architectural structural covering; and
simultaneously changing the displayed position of the representation of the first architectural structural covering to mirror the cycle of the physical position of the first architectural structural covering.

20. The method of claim 19, wherein the cycle of the physical position comprises changing a tilt degree of vanes in the first architectural structural covering.

21. A non-transitory computer-readable storage medium comprising instructions that, upon execution on a device, configure the device to perform operations comprising:
receiving, from an architectural structural covering, a signal that indicates a first position of the architectural structural covering;
associating the signal with a list of architectural structural coverings, the list displayable on a user interface of the device, wherein the user interface comprises:
a representation of the architectural structural covering, the representation having a first displayed position that corresponds to the first position indicated by the signal; and
a position control for controlling the architectural structural covering;
receiving user input via the position control, the user input indicating a second position of the architectural structural covering;
sending, to the architectural structural covering, one or more instructions indicating the second position; and
changing the first displayed position of the representation to a second displayed position that corresponds to the second position of the architectural structural covering.

22. The non-transitory computer-readable storage medium of claim 21, further comprising:
receiving, from the architectural structural covering and after the one or more instructions are sent, another signal indicating the second position of the architectural structural covering, wherein the first displayed position is changed to the second displayed position based on the other signal.

* * * * *